United States Patent [19]
Trask, II

[11] 3,863,492
[45] Feb. 4, 1975

[54] APPARATUS FOR MEASURING THE DIAMETER FOR THROUGH HOLES

[75] Inventor: R. Pierce Trask, II, Silver Spring, Md.

[73] Assignee: The United States of America as represented by the Secretary of the Army, Washington, D.C.

[22] Filed: June 28, 1973

[21] Appl. No.: 374,606

[52] U.S. Cl. ................................................ 73/37.5
[51] Int. Cl. ........................................ G01b 13/08
[58] Field of Search ............ 73/37, 37.5; 33/DIG. 2

[56] References Cited
UNITED STATES PATENTS

| | | | |
|---|---|---|---|
| 3,377,842 | 4/1968 | Pitney | 73/37 |
| 3,535,916 | 10/1970 | Adams | 73/37.5 |
| 3,681,974 | 8/1972 | McLellan et al. | 73/37.5 |
| 3,759,088 | 9/1973 | Hardwick III | 73/37 |

FOREIGN PATENTS OR APPLICATIONS

| | | | |
|---|---|---|---|
| 712,995 | 8/1954 | Great Britain | 73/37.5 |
| 1,223,148 | 2/1971 | Great Britain | 73/37.5 |

Primary Examiner—Richard C. Queisser
Assistant Examiner—Daniel M. Yasich
Attorney, Agent, or Firm—Nathan Edelberg; Robert P. Gibson; Saul Elbaum

[57] ABSTRACT

An apparatus for measuring the diameter of a through hole, in which an emitter round passage way in an object permits fluid to flow therethrough. A plenum has a nozzle attached thereto for emitting a constant jet of fluid to be directed through said through hole and a supply plenum has a nozzle attached thereto and is directed in a direction opposite to said first nozzle. The jet of fluid from the supply plenum is partially deflected by that portion of the air from the emitter nozzle which passes through the hole to be measured and then passes through an opening in the periphery of the passage way from the supply plenum to the supply nozzle. The volume of air deflected from the supply jet is measured by a flow meter to determine the diameter of the through hole. Another version of the invention comprises in addition an aperture in the passage way connecting the emitter plenum to the emitter nozzle which leads to another collection plenum for emitter fluid deflected from the periphery of the object having the through hole, to be measured, therein. The fluid from each of the two collection plenums is fed into a flueric differential amplifier and the output of said amplifier is used as a measure of the diameter of the through hole.

9 Claims, 5 Drawing Figures

PATENTED FEB 4 1975

APPARATUS FOR MEASURING THE DIAMETER FOR THROUGH HOLES

RIGHTS OF THE GOVERNMENT

The invention described herein may be manufactured, used, and licensed for or by the United States Government for governmental purposes without the payment to the inventor of any royalty thereon.

BACKGROUND OF THE INVENTION

This invention relates generally to devices for measuring the diameter of a hole having a periphery boundary comprising a circle and extending entirely through an object. Specifically this invention relates to an apparatus for measuring the diameter of the through hole by passing a stream of air or other fluids therethrough and measuring the amount of air reflected by that portion of the air which is passed through the hole as it is emitted from an additional supply stream.

The most accurate means heretofore for measuring the inside diameter of a hole of an object was to insert calibers and fully extend them to the opposite extremities of the hole. Other mechanical gages for measuring the diameter properly on a trial and error basis uses rods of specific diameters inserted into the holes until as close a fit as possible is obtained. The diameter of said rod is then measured. The invention described herein overcomes many of the disadvantages of the foregoing and other constructions of devices for measuring the diameter of a through hole.

It is therefore an object of this invention to provide a new and novel apparatus for measuring the diameter of a through hole utilizing flueric principles.

It is yet another object of this invention to provide a new and novel apparatus for measuring the diameter of a through hole by directing air through said hole.

It is yet an additional object of this invention to provide a new and novel apparatus for measuring the diameter of a through hole without actually contacting the surface of the object, the hole, or any portion of the hole itself.

It is another object of this invention to provide a new and novel apparatus for measuring the diameter of a through hole which is relatively insensitive to sensor work piece misalignment.

It is still an additional object of this invention to provide an apparatus for measuring the diameter of a through hole which is very easy to operate and which may be quickly operated to provide a very quick readout.

These and other objects of the present invention will become more fully apparent with reference to the following specifications and drawings which relate to two preferred embodiments of the invention described herein.

SUMMARY

An apparatus for measuring the diameter of a through hole comprising a round passage way extending entirely through an object wherein said apparatus comprises an emitter plenum having connected thereto an emitter nozzle for emitting a jet of air through said through hole such that a supply jet of air emitted from a supply jet connected to a supply plenum is deflected by the portion of the emitter jet passing through the through hole such that air of the supply jet within the supply nozzle impacted by the air of the emitter jet passing through the through hole is collected in a plenum connected to the periphery of the passage way leading to the supply nozzle, the flow of said air in the collection plenum being a measure of the diameter of the through hole. Another embodiment of this invention comprises an additional collector plenum connected to the passage way connecting the emitter plenum to the emitter nozzle and collecting air deflected by the pheriphery of the through hole nearest the emitter nozzle. The flow from this additional collection plenum is fed into a differential amplifier along with the flow from said first collection plenum and a measure of the flow of the output from said differential amplifier provides a measure of the diameter of said through hole.

BRIEF DESCRIPTION OF THE DRAWINGS

The specific nature of the invention as well as other objects, aspects, uses, and advantages thereof will clearly appear from the following descriptions and from the accompanying drawings, in which:

FIG. 2b is a flow diagram illustrating the operation of the apparatus shown in FIG. 2a.

These and other objects of the present invention will become more fully apparent with reference to the following specifications and the drawings which relate to a preferred embodiment of the present invention.

DESCRIPTION OF THE PREFERRED EMBODIMENT

Figure 1A:
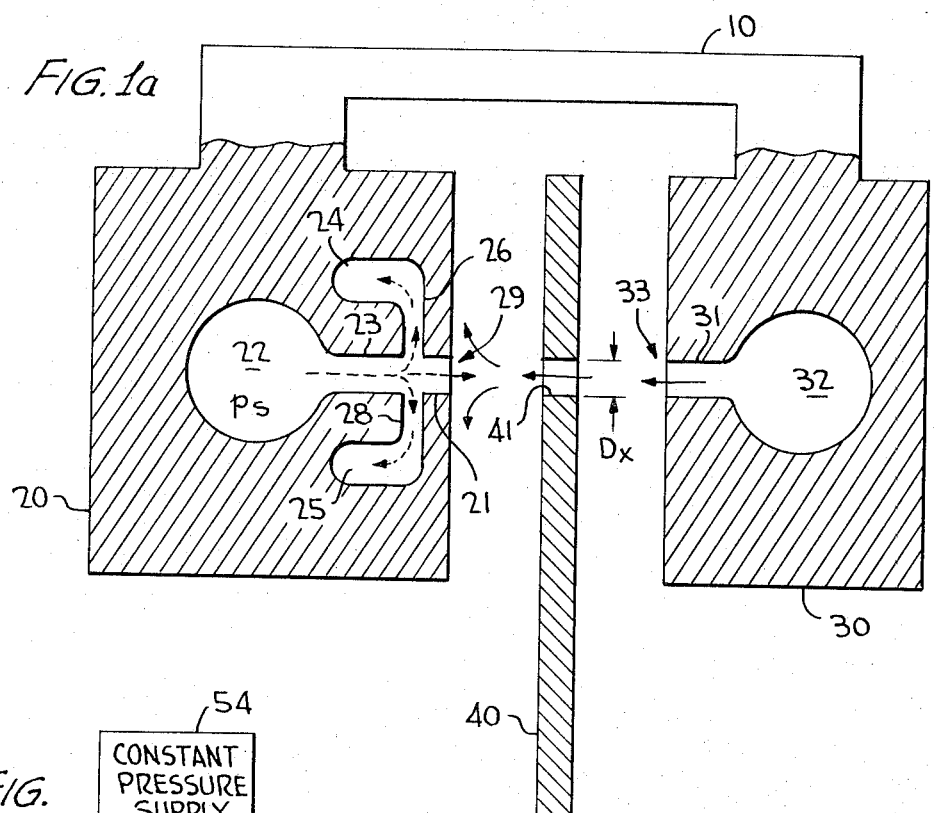
FIG. 1a is a cross section of the apparatus for measuring the diameter of a through hole comprising only one collection plenum located in the periphery of the passage way to the supply nozzle.

The present invention will be easily understood in its essential aspects by reference to FIG. 1a wherein there is illustrated a cross sectional view of a particular preferred embodiment of the invention comprising one collection plenum located in the periphery of the passage way connecting the supply plenum to the supply nozzle. In this figure the work piece 40 having the hole to be measured 41 of diameter Dx is inserted in between sensor elements 20 and 30, said elements being connected by a connection 10. Air is permitted to flow from emitter plenum 32 through the passage way 31 of the emitter member 30 and permitted to be expelled from the nozzle 33 of the emitter member 30. A portion of the air emitted from emitter nozzle 33 is permitted by hole 41 at the work piece 40 to pass there through and impinge upon the supply nozzle 29 having supply fluid being emitted therefrom. Supply plenum 22 located within member 20 is connected to the nozzle 29 by means of passage way 23. The supply nozzle 29 is partially formed by a portion of the passage way located at 21. Located at the periphery of the passage way 23 are two apertures 26 and 28 connected to collection plenums 24 and 25. Air from the hole 41 impinging upon the jet of fluid being emitted from nozzle 29 causes air within the passage way 23 to be impacted and then deflected into apertures 26 and 28 and eventually into plenums 24 and 25. The pressure of the air collected in plenums 24 and 25 is measured by means of commonly known gauges in the art of fluerics and this measurement is used to provide an indication of the diameter Dx of the through hole 41.

Figure 1B:
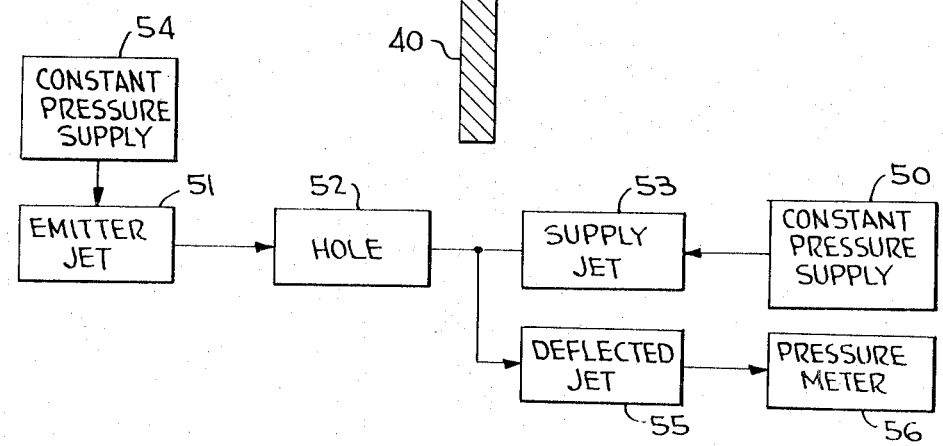
FIG. 1b is a flow diagram of the apparatus illustrated in FIG. 1b.

In FIG. 1b is shown a flow diagram of the operation of the device shown in FIG. 1a. The plenums 22 and 32 of FIG. 1a are represented in FIG. 1b by constant pressure air supplies 50 and 54, respectively. Constant pressure air supply 50 supplies air to supply jet 53 and constant pressure air supply 54 supplies air to emitter jet 51. The air of the emitter jet 51 passing through the hole 52 deflects a portion of the supply jet 53. The deflected jet portion 55 provides an indication or measure of the diameter, Dx, by measurement of the pressure afforded by said deflected jet 55.

Figure 2A:
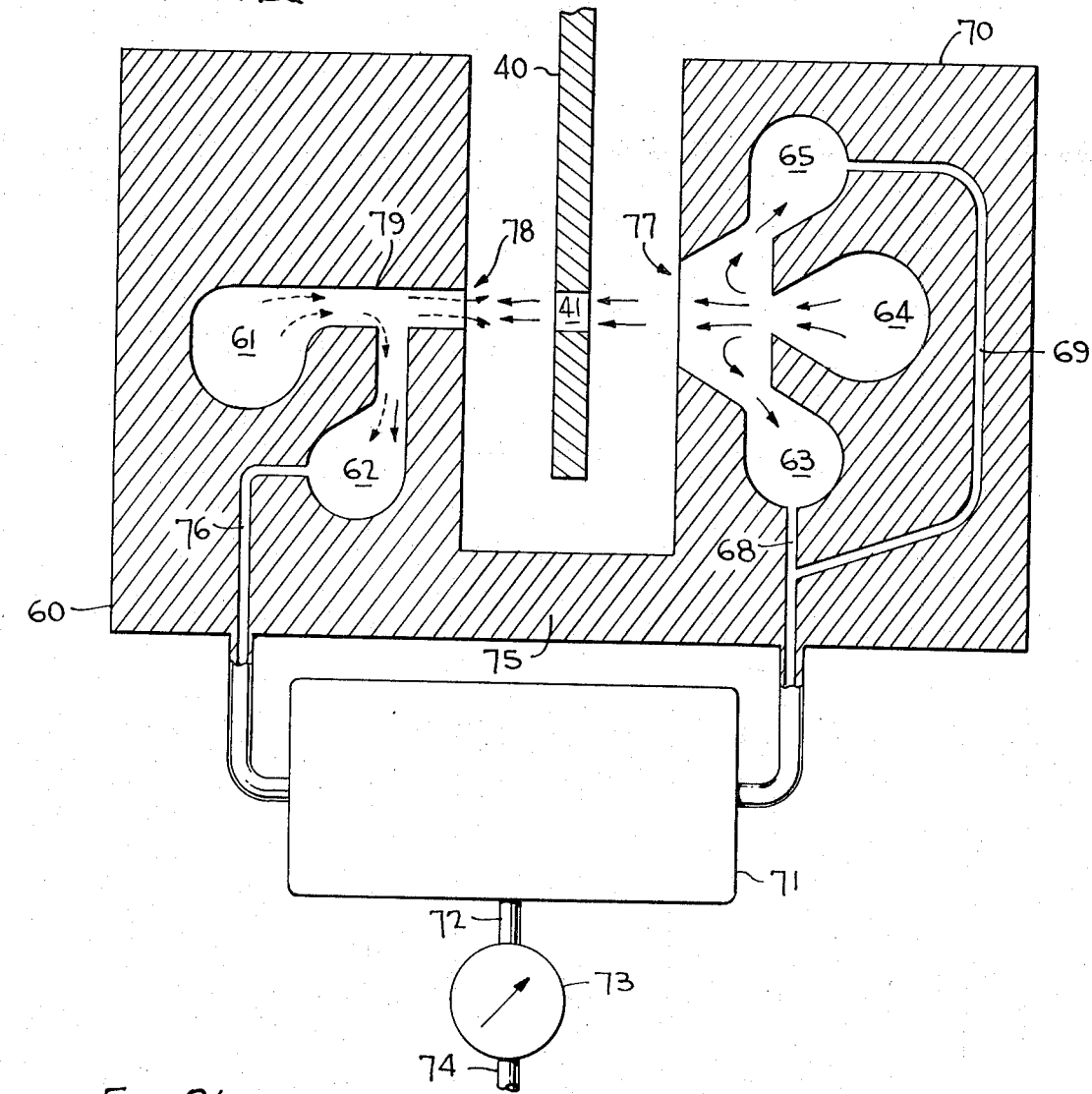
FIG. 2a is a cut away view of the apparatus for measuring the diameter of a through hole comprising a collection plenum located next to the passage ways to both the supply nozzle and the emitter nozzle.

FIG. 2a is a cut away illustration of another embodiment of the apparatus for measuring the diameter of a through hole wherein collection plenums are located at both the supply and emitter members of said apparatus and a flueric differential amplifier is used in the measurement of the pressure from said collection plenums. In this figure the work piece 40 having through hole 41 therein is inserted in between supply sensor member 60 and emitter sensor member 70. Emitter sensor member 70 comprises a nozzle 77 connected to plenums 63 and 65 axisymmetrical and diemetrically located with respect to the principal axis of said nozzle. Further comprising said emitter member 70 is emitter plenum 64 connected to the passage way leading to nozzle 77. Plenums 63 and 65 are interconnected to each other by means of passage ways 68 and 69, respectively. The output from these plenums feed into one input of the flueric differential amplifier 71.

Supply member 60 comprises supply nozzle 78 interconnected to supply plenum 61 via passage way 79. Also, collection plenum 62 is located in the periphery of passage way 79 and is connected thereto. Collection plenum 62 is interconnected to another input of the flueric differential amplifier 71 via passage way 76. Supply member 60 is connected to emitter member 70 by means of member 75.

The apparatus of the present invention operates substantially as follows: The work piece having a hole therein provides some impedance to the flow of air emitted from the emitter nozzle and thus air actually deflected therefrom may be correlated with the amount of deflection provided to the supply jet from the supply member or nozzle and a measure of the pressure of these deflections provides a measure of the diameter of the through hole 41. Hence, in particular, fluid is emitted from plenum 64 and permitted to emerge from emitter jet 77 wherein a portion thereof impinges upon the periphery of hole 41 and another portion thereof is permitted to flow through said hole and impinge upon the jet of fluid being emitted from supply nozzle 78 and thereby cause a portion of the fluid normally emitted from supply nozzle 78 to be deflected into collection plenum 62. In addition, the fluid impinging upon the periphery of the hole 41 from nozzle 77 causes a portion of the fluid normally emitted therefrom to be deflected into collection plenums 63 and 65. Fluid deflected into supply collection plenum 62 is fed into one port of a differential amplifier 71 via passage way 76 and the fluid collected in emitter collection plenums 63 and 65 is fed into the other input port of the differential amplifier 71 by means of passage ways 68 and 69, respectively. The differential amplifier 71 is one of the type commonly known to those skilled in the art of fluerics. The output of the differential amplifier 71 is fed into a pressure meter 73 by means of passage way 72. Member illustrated at 74 provides an exhaust for flow meter 73.

Figure 2B:
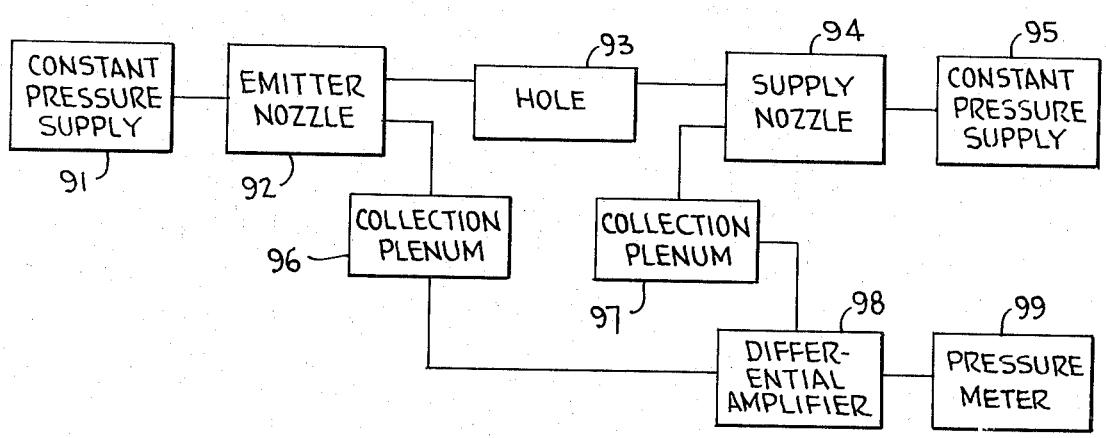

In FIG. 2b is illustrated a flow diagram of the operation of the apparatus shown in FIG. 2a. Constant pressure air supply 91 provides for a jet of fluid from emitter nozzle 92. Constant pressure air supply 95 provides for a jet of fluid from supply nozzle 94 to hole 93. A portion of the fluid deflected within emitter nozzle 92 and a portion of the fluid deflected within supply nozzle 94 is fed to collection plenum 96 and collection plenum 97 respectively. The output flow of collection plenum 96 is fed into one input port of the differential amplifier 98 and the output flow of collection plenum 97 is fed into other input port of differential amplifier 98. The output of differential amplifier 98 is fed into a pressure meter 99 to provide a measure of the diameter, Dx, of hole 93.

Figure 3:
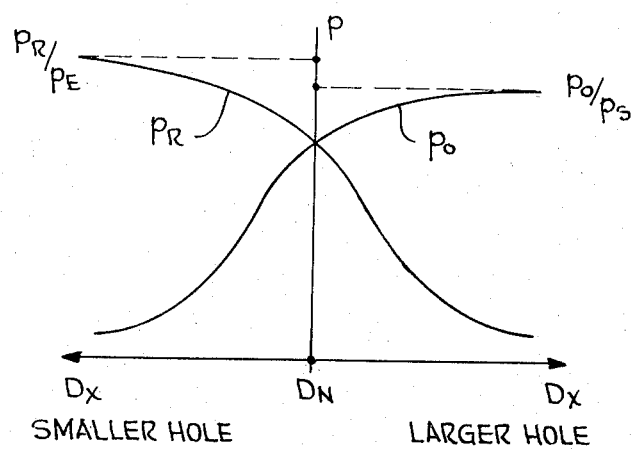
FIG. 3 is a graph of pressure versus the diameter of the through hole illustrating the relationship between the diameter of the through hole and output pressure in the collection plenum of the supply nozzle and the collection plenum of the emitter nozzle.

FIG. 3 is a graph of the relationship between the diameter, Dx, of the hole within the work piece; the pressure output of the collection plenum of the supply nozzle, Po; and the pressure output from the collection plenum of the emitter nozzle, $P_R$ (in the case of FIG. 2a). Ps denotes the pressure from the supply plenum. $P_E$ denotes the pressure of the air supply from the emitter plenum. The symbol P designating the vertical axis represents pressure generally. The point designated as $D_N$ is the nominal diameter of the hole to be measured. As can be seen by the relationships illustrated in this graph, there is a definite correlation between the diameter, Dx, of the through hole and pressure, $P_0$, and the pressure, $P_R$.

Note that Dx to the left of $D_N$ for FIG. 3 approaches a minimum. Dx to the right of $D_N$ approaches a maximum. In the embodiment of FIG. 1 Dx may be measured accurately from a minimum Dx up to $P_O = P_S$. In the embodiment of FIG. 2a the measurement range is determined by both $P_R$ and $P_O$. The limits for this second embodiment, as seen from FIG. 3, are set by $P_E$ and $P_S$. When $P_R = P_E$ a minimum Dx measurement is reached and when $P_O = P_S$ a maximum Dx measurement is reached.

The inventor wishes it to be understood that he does not desire to be limited to the exact details shown and described herein for obvious modifications will occur to a person skilled in this art. Hence, although the specific embodiment described herein is applied only to holes having a cylindrical geometry, differently shaped holes and spaces may also be measured using the apparatus of the invention.

What is claimed is:

1. An apparatus for measuring the diameter of through holes in a wink piece comprising:
   a. spaced apart interconnected fluid supply means including first and second means, said work piece being inserted therebetween;
   b. b said first means for emitting a constant emitter jet of fluid through a through hole in said work piece;

c. said second means for emitting a constant jet of fluid opposing said emitter jet, said second means being located on the side of said hole opposite said first means;
d. means for receiving fluid deflected from said opposed fluid supply jets; and,
e. means for measuring the pressure of said deflected fluid whereby the diameter of said through hole is determined.

2. The apparatus of claim 1 wherein said first means comprises an emitter nozzle.

3. The apparatus of claim 2 wherein said second means comprises a supply nozzle.

4. The apparatus of claim 3 wherein said means for receiving fluid deflected from said supply jet comprises at least one aperture located transversely of the fluid jet in the periphery of said supply nozzle.

5. The apparatus of claim 4 wherein said means for measuring said pressure comprises a pressure gauge.

6. The apparatus of claim 4 further comprising a first means for receiving fluid deflected from said emitter jet.

7. The apparatus of claim 6 further comprising a differential amplifier connected to said means for receiving fluid deflected from said emitter jet and said means for receiving fluid deflected from said supply jet whereby the output of said amplifier is a measure of the diameter of said through hole.

8. The apparatus of claim 7 further comprising a second means for receiving the fluid deflected from said emitter jet located diametrically opposite said first named means for receiving fluid deflected from said emitter jet.

9. The apparatus of claim 8 wherein said first and second means for receiving the fluid deflected from said emitter jet each comprise one aperture located in the periphery of said emitter nozzle.

* * * * *